US012559657B2

(12) United States Patent
Ringenbach et al.

(10) Patent No.: US 12,559,657 B2
(45) Date of Patent: Feb. 24, 2026

(54) ABRASIVE ARTICLES AND METHODS FOR FORMING SAME

(71) Applicants: SAINT-GOBAIN ABRASIVES, INC., Worcester, MA (US); SAINT-GOBAIN SURFACE SOLUTIONS FRANCE, Conflans-Sainte-Honorine (FR)

(72) Inventors: Gwenaëlle Ringenbach, Bascharage (LU); Ignazio Gosamo, Léglise (BE)

(73) Assignees: SAINT-GOBAIN ABRASIVES, INC., Worcester, MA (US); SAINT-GOBAIN SURFACE SOLUTIONS FRANCE, Conflans-Sainte-Honorine (FR)

(*) Notice: Subject to any disclaimer, the term of this patent is extended or adjusted under 35 U.S.C. 154(b) by 442 days.

(21) Appl. No.: 18/148,043

(22) Filed: Dec. 29, 2022

(65) Prior Publication Data

US 2023/0203355 A1     Jun. 29, 2023

Related U.S. Application Data

(60) Provisional application No. 63/266,106, filed on Dec. 29, 2021.

(51) Int. Cl.
*C09K 3/14* (2006.01)

(52) U.S. Cl.
CPC .................................. *C09K 3/1409* (2013.01)

(58) Field of Classification Search
CPC .............................. C09K 3/1409; B24D 3/007
See application file for complete search history.

(56) References Cited

U.S. PATENT DOCUMENTS

| | | | | |
|---|---|---|---|---|
| 4,854,295 A | * | 8/1989 | Sakarcan | ............... B24D 5/123 451/547 |
| 5,911,620 A | | 6/1999 | Spangenberg et al. | |
| 6,401,705 B1 | * | 6/2002 | Suzuki | .................... B24D 5/12 451/547 |
| 6,564,887 B2 | | 5/2003 | Hong et al. | |
| 6,638,152 B1 | | 10/2003 | Kim et al. | |
| 8,028,687 B2 | | 10/2011 | Kim et al. | |

(Continued)

FOREIGN PATENT DOCUMENTS

| | | |
|---|---|---|
| CN | 201253916 Y | 6/2009 |
| JP | H07317481 A | 12/1995 |

(Continued)

OTHER PUBLICATIONS

International Search Report and Written Opinion for PCT/US2022/082541, mailed May 9, 2023, 10 pages.

(Continued)

*Primary Examiner* — Amber R Orlando
*Assistant Examiner* — Anastasia A. Kuvayskaya
(74) *Attorney, Agent, or Firm* — Abel Schillinger, LLP; Arpan Ghosh

(57) ABSTRACT

An abrasive article can include a core and an abrasive component attached to the core. The abrasive component may include a body including a leading end and a trailing end, wherein the leading end has a width greater than a width of the trailing end. In an embodiment, the abrasive component may include a body including a first abrasive portion and a second abrasive portion, wherein a radial width of the first abrasive portion is greater than a radial width of the second abrasive portion.

20 Claims, 3 Drawing Sheets

(56) References Cited

U.S. PATENT DOCUMENTS

| | | | |
|---|---|---|---|
| 9,149,913 B2 | 10/2015 | Gosamo | |
| 2006/0130823 A1 | 6/2006 | Kim et al. | |
| 2014/0010998 A1* | 1/2014 | Hoang | B24D 5/123 |
| | | | 51/309 |

FOREIGN PATENT DOCUMENTS

| | | | |
|---|---|---|---|
| JP | H11207635 A | 8/1999 | |
| JP | 2004276197 A | 10/2004 | |
| JP | 3587589 B2 | 11/2004 | |
| JP | 2018130791 A | 8/2018 | |
| KR | 100337655 B1 | 5/2002 | |
| WO | 2008093941 A1 | 8/2008 | |
| WO | 2018226912 A1 | 12/2018 | |

OTHER PUBLICATIONS

Dymatec, Turbo S Diamond Core Drill Segments, Diamond Cores, https://www.dymatecuk.com/product/turbo-s-diamond-core-drill-segments/, last accessed Jun. 29, 2023.

* cited by examiner

ABRASIVE ARTICLES AND METHODS FOR FORMING SAME

CROSS-REFERENCE TO RELATED APPLICATION(S)

This application claims priority under 35 U.S.C. § 119(e) to U.S. Provisional Application No. 63/266,106, entitled "ABRASIVE ARTICLES AND METHODS FOR FORMING SAME," by Gwenaelle RINGENBACH et al., filed Dec. 29, 2021, which is assigned to the current assignee hereof and incorporated herein by reference in its entirety.

FIELD OF THE DISCLOSURE

The following is generally directed to abrasive articles and processes for forming same, and more particularly, to abrasive articles including one or more abrasive components attached to a core and methods of forming such abrasive articles.

DESCRIPTION OF THE RELATED ART

Abrasive articles are used in material removal operations, such as cutting, grinding, or shaping various materials. Fixed abrasive articles include abrasive particles held in a bond material. The bond material can include an organic and/or inorganic material. The industry continues to demand improved abrasive articles.

The construction industry utilizes a variety of tools for cutting and grinding of construction materials. Cutting and grinding tools are required for to remove or refinish old sections of roads. Additionally, quarrying and preparing finishing materials, such as stone slabs used for floors and building facades, require tools for drilling, cutting, and polishing. Typically, these tools include abrasive segments bonded to a base element or core. As with other industries, improvements to these abrasive tools are always sought.

BRIEF DESCRIPTION OF THE DRAWINGS

The present disclosure may be better understood, and its numerous features and advantages made apparent to those skilled in the art by referencing the accompanying drawings.

Figure 1:
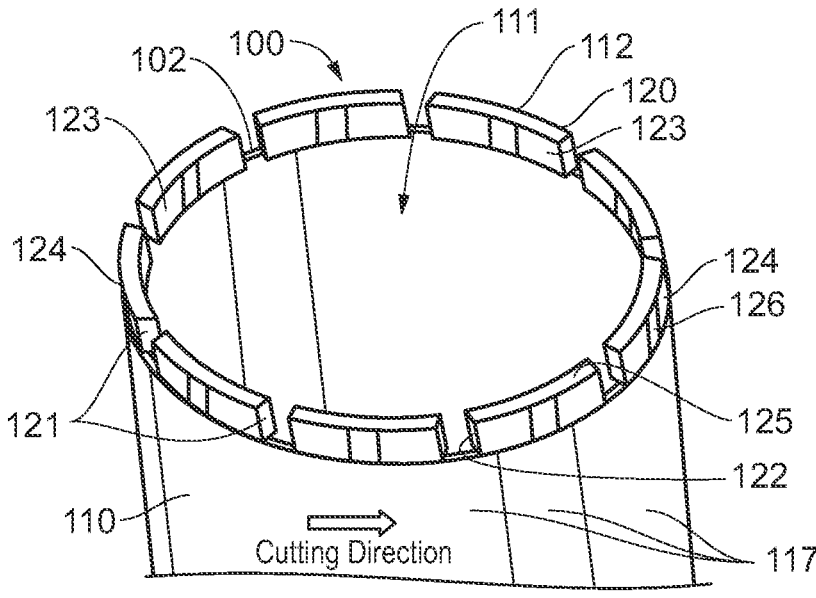
FIG. 1 includes a perspective view of a portion of an abrasive article according to an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings provided herein. The following disclosure will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having," or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

Embodiments are directed to abrasive articles including a core and at least one abrasive component attached to the core. The abrasive component may include an abrasive segment, an abrasive ring, a ring section, or the like. The abrasive component can include a body including a leading end and a trailing end, wherein the width of the leading end and the width of the trailing end may be different. In an embodiment, the leading end may have a width greater than a width of the trailing end. In another embodiment, the width of the leading end may be smaller than the trailing end. In particular embodiments, the abrasive article can include a plurality of abrasive segments attached to the core, wherein each of the segments may include a leading end having a width different from a width of a trailing end. In particular examples, each of the segments may include a leading end having a width greater than the width of the trailing end. The abrasive article may include a thin wheel, a grinding cup, a cutting wheel, a grinding wheel, a drill bit, e.g., a core drill bit, or may be in another suitable form. The abrasive article can have reduced friction during a material removal operation, such as cutting, grinding, or drilling, and improved operation efficiency.

Referring to FIG. 1, a portion of an exemplary abrasive article 100 in the form of a core drill is illustrated. In the illustrated embodiment, the abrasive article 100 can include a plurality of abrasive components 120 in the form of segments attached to a core 110. The core 110 can have an elongated shape. The plurality of abrasive components 120 can be spaced apart from one another by a same distance. In another example, the distances between abrasive components 120 may be different.

Figure 2:
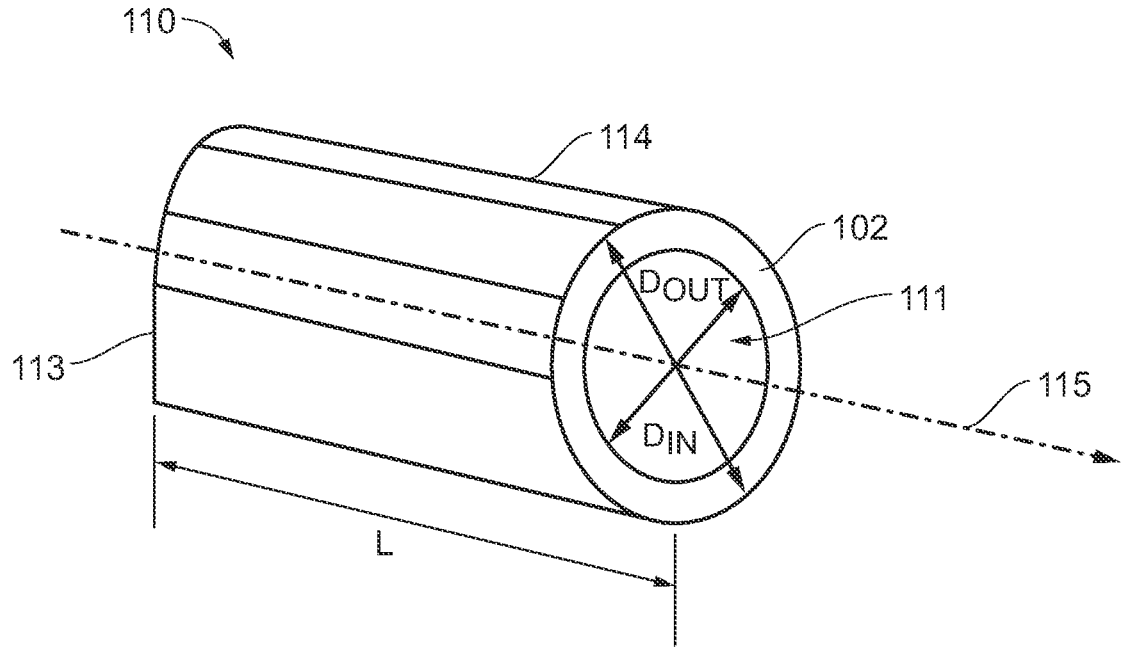
FIG. 2 includes an illustration of a perspective view of an exemplary core of an abrasive article according to an embodiment.

Briefly turning to FIG. 2, the core 110 can include a longitudinal axis 115 extending in the axial direction and a length L extending along the longitudinal axis 115. The core can include an end surface 112 and an opposite end surface 113. The abrasive components 120 can be attached to the end surface 112 along the circumferential direction of the core (as illustrated in FIG. 1). In an embodiment, a shaft (not illustrated) may be attached to the end surface 113.

The core 110 can be hollow and have a generally cylindrical shape. The core 110 can include a central opening 111 extending along the longitudinal axis 115 in the axial direction. In an embodiment, the central opening 111 can extend for at least a portion or the entire length L of the core. The core 110 can include a lateral wall 114 extending between the end surfaces 112 and 113. The lateral wall 114 can include an interior circumferential surface defining the central opening 111 and an exterior surface. As illustrated in FIGS. 1 and 2, the exterior surface can include a plurality of side surfaces 117 extending longitudinally. In another embodiment, the core can include a circumferential exterior surface.

The core 110 can include an inner diameter $D_{IN}$ defined by the interior surface of the core. The inner diameter $D_{IN}$ can pass the center of the central opening and define the diameter of the central opening. The core 110 may also include an outer diameter $D_{OUT}$ passing the center of the central opening and defined by the exterior surface of the core.

In a further embodiment, the core can have a shape other than a cylindrical shape. For example, the core can include a hollow cone, a hollow frustum, a disc, a solid plate, a hollow cup, or another suitable shape to carry one or more abrasive components 120.

In an embodiment, the core of the abrasive article may be made of a metal or metal alloy. For instance, the core can be made of steel, and particularly, a heat treatable steel alloys, such as 30CrNiMo8, 25CrMo4, 75Cr1, C60, or similar steel alloys, or simple construction steel like St 37, St 57, St 60 or similar. The core can have a tensile strength of at least about 600 N/mm². The core can be formed by a variety of metallurgical techniques known in the art.

Turning to FIG. 1, as illustrated, the abrasive component 120 can have a counter clockwise cutting direction and include a body 112 including a leading end 121 and a trailing end 122. The leading end 121 may have a greater radial width than the trailing end 122. The body 112 can also include an inner circumferential surface 123 and an outer circumferential surface 124 extending between the leading and trailing ends 121 and 122. The inner circumferential surface 123 and the outer circumferential surface 124 may extend in the longitudinal direction and away from the end 102 of the core 110. The body 112 can further include a grinding face 125 and an opposite face 126 that is attached to the core 110. A height, H, of the body 112 can be measured in the axial direction from the face 126 to the grinding face 125. In an embodiment, the abrasive component 120 can have substantially a same height through the circumferential length of the body 112 and/or through the radial width of the body 112. As used herein, the circumferential length of the body 112 is intended to refer to the length extending in the circumferential direction of the body 112 between the leading and trailing ends 121 and 122. The radial width of an end or an abrasive portion is intended to refer to a width between the inner and outer circumferential walls 123 and 124 in the radial direction.

In another embodiment, the abrasive article 100 may have a clockwise cutting direction. Accordingly, the end 122 may function as the attack of the abrasive component 120 and may be referred to as the leading end; and the end 121 may be the trailing end. Accordingly, in an embodiment, the abrasive article may include abrasive components, wherein the leading end may include a radial width smaller than a radial width of the trailing end.

Figure 3A:
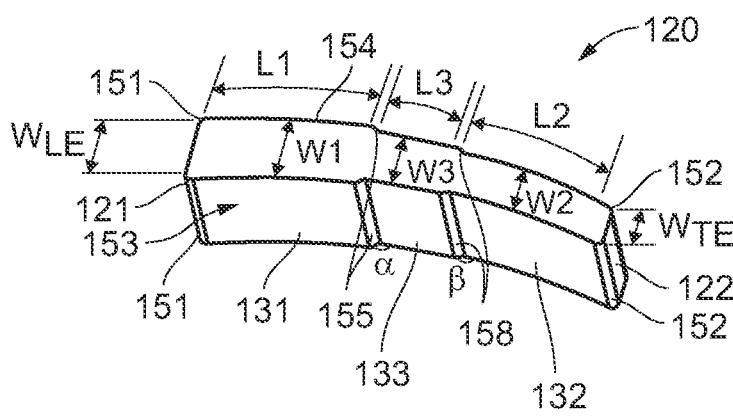
FIG. 3A includes an illustration of a perspective view of an exemplary abrasive component according to embodiments.

FIG. 3A includes an illustration of a perspective view of the abrasive component 120. In an embodiment, the end 121 can be the leading end and the end 122 can be the trailing end. In another embodiment, the end 122 can be the leading end and the end 121 can be the trailing end.

As illustrated in FIG. 3A, the body 112 can include transitional edges between adjacent abrasive portions that may facilitate changes in the radial width and/or connection of the abrasive portions. For example, transitional edge 155 may facilitate changes in the radial width from W1 to W3 and connection between the first abrasive portion 131 and the third abrasive portion 133 that has a smaller radial width W3 than the radial width W1 of the first abrasive portion. Similarly, a transitional edge 158 may be formed to facilitate changes in the radial width from W3 to W2 and connection between the third abrasive portion 133 and the second abrasive portion 132 that has a smaller radial width W2 than W3.

As further illustrated, the abrasive component 120 can include a transitional edge 151 connecting the end 121 to the inner circumferential surface 123 and outer circumferential surface 124. The transitional edge 152 may connect the end 121 to the inner circumferential surface 123 and outer circumferential surface 124. In an embodiment, the transitional edge (e.g., 151, 152, 155 and 158 illustrated in FIGS. 3A, 3B, and 3D) can include a beveled edge, a round corner, a chamfer, or combination thereof. In a further embodiment, the transitional edge (e.g., 151, 152, 155 and 158 illustrated in FIGS. 3A, 3B, and 3D) may form an obtuse angle with the inner circumferential surface, the outer circumferential surface, the end 122, and/or the end 121, such as angles α and β. A skilled can appreciate that an acute and/or a right angle may be formed between a transitional edge and an abrasive portion and/or a trailing and/or leading end connected to the transitional edge. For example, angles α and β may be an acute or right angle independently in implementations.

In a further embodiment, the abrasive portions 131, 132 and 133 may be formed integrally to form a unitary body 112. In an aspect, a transitional edge may be a portion of at least one of the adjacent abrasive portions such that the adjacent abrasive portions may abut each other. For example, the transitional edge 155 may be a portion of the abrasive portion 131, and the transitional edge 158 may be a portion of the abrasive portion 133. In a further example, transitional edges, such as 151, 152, 155 and 158 may define one or more tapered regions of abrasive portions 131, 132, and/or 133. A tapered region may facilitate changes in radial width between abutting abrasive portions.

In a further embodiment, transitional edges, such as 151, 152, 155 and 158, may be a portion of the inner circumference surface 123 and/or a portion of the outer circumferential surface 124. For example, the inner and outer circumferential surfaces 123 and 124 may each include a plurality of portions corresponding to the abrasive portions 131, 132, or 133 connected by transitional edges 155 and 158. The inner and outer circumferential surfaces 123 and 124 may further include transitional edges 151 and 152 connected to the ends 121 and 122, respectively.

Figure 3B:
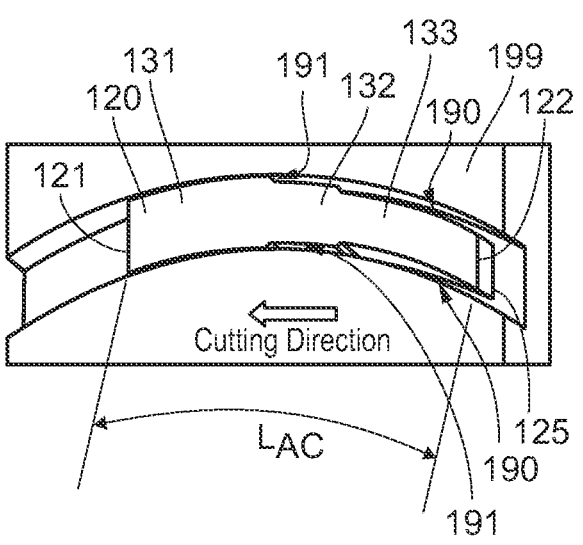
FIG. 3B includes an illustration of an exemplary abrasive component in contact with a workpiece according to an embodiment.

In a further embodiment, abrasive portions next to each other may be connected without a transitional edge. In another embodiment, the end 121, the end 122, or both may be connected to the inner and outer circumferential surfaces directly without a transition edge. For example, at least one of the inner or outer circumferential surfaces and at least one of the leading or trailing end may define an angle. In a further instance, the angle may be acute, obtuse, or approximately 90°. In another example, a transitional edge may be absent between abutting abrasive portions. Further as illustrated in FIG. 3F, a transitional edge may be absent between the end 402 and one or both of inner and outer circumferential surfaces 423 and 424 and/or absent between the end 403 and inner and outer circumferential walls 423 and 424.

The leading end 121 can include a width, $W_{LE}$, extending in the radial direction, and the trailing end 122 can include a width, $W_{TE}$, extending in the radial direction, wherein $W_{LE} > W_{TE}$. In an embodiment, the body 112 can include a particular $W_{LE}$, $W_{TE}$, ratio of the width $W_{LE}$ to the width $W_{TE}$, or any combination thereof, which may facilitate improved performance of the abrasive article. In a further embodiment, the width, $W_{TE}$, of the trailing end 122 may be at most 95% of the width, $W_{LE}$, of the leading end, such as at most 93%, at most 90%, at most 88%, at most 85%, at most 82%, at most 80%, at most 78%, at most 75%, at most 73%, at most 71%, at most 68%, at most 65%, at most 62%, at most 60%, at most 58%, at most 56%, at most 53%, at most 51%, at most 47%, at most 45%, at most 43%, at most 40%, at most 37%, at most 35%, or at most 32% of the width $W_{LE}$ Additionally or alternatively, the width, Wm, of the trailing end 122 may be at least 15% of the width, $W_{LE}$, of the leading end, such as at least 18%, at least 20%, at least 24%, at least 25%, at least 27%, at least 29%, at least 30%, at least 32%, at least 35%, at least 37%, at least 39%, at least 41%, at least 43%, at least 45%, at least 50%, at least 52%, or at least 55% of the width $W_{LE}$ Moreover, the width, $W_{TE}$, of the trailing end 122 may be in a range including any of the minimum and maximum values noted herein.

In an embodiment, the body 112 of the abrasive component 120 can include a first abrasive portion 131 including the leading end 121 and a second portion 132 including the trailing end 122. The first abrasive portion may also be referred to as leading abrasive portion, and the second abrasive portion may also be referred to as trailing abrasive portion in this disclosure. The first abrasive portion 131 can include a radial with W1 extending in the radial direction, and the second abrasive portion 132 can include a radial width W2 extending in the radial direction, wherein W1>W2. The radial width of the abrasive portions can be measured from the inner circumferential wall to the outer circumferential wall of the respective abrasive portions.

As illustrated in FIG. 3A, the radial width W1 can be substantially the same along the circumferential length L1 of the first abrasive portion 131, and the radial width W2 may be substantially the same along the circumferential length L2 of the second abrasive portion 132. In another embodiment, the radial width of the first and/or the second abrasive portion may change along the circumferential length of the respective abrasive portion. In an example, the first abrasive portion may have a tapered shape, wherein the radial width can decrease as the inner and outer circumferential surfaces extend away from the leading end. In another example, the second abrasive portion may have a tapered shape, wherein the radial width of the second portion can decrease as the inner and outer circumferential surfaces extend away from the first abrasive portion and toward the trailing end.

In the particular embodiment illustrated in FIG. 3A, the body 112 can include a third abrasive portion 133 connected to the first and second abrasive portions 131 and 132. The third abrasive portion 133 can include a radial width W3 extending in the radial direction. The radial width W3 can be substantially the same along the circumferential length L3 of the third abrasive portion 133. The radial width W1 can be greater than the radial width W3, and the radial width W3 can be greater than the radial the radial width W2. In a further embodiment, the third abrasive portion may have a tapered shape, wherein the radial width of the third portion can decrease as the inner and outer circumferential surfaces extend away from the first abrasive portion and toward the trailing end.

In an embodiment, the body 112 can include a particular width of the first abrasive portion, W1, that may facilitate improved performance of the abrasive article. In a further embodiment, the body 112 can include a particular width, W2, of the second abrasive portion that may facilitate improved performance of the abrasive article. In a further embodiment, the body 112 can include a particular ratio of W1 to W2 that facilitate improved performance of the abrasive article. In still a further embodiment, the width, W2, of the second portion may be at most 95% of the width, W1, of the first abrasive portion, such as at most 93%, at most 90%, at most 88%, at most 85%, at most 82%, at most 80%, at most 78%, at most 75%, at most 73%, at most 71%, at most 68%, at most 65%, at most 62%, at most 60%, at most 58%, at most 56%, at most 53%, at most 51%, at most 47%, at most 45%, at most 43%, at most 40%, at most 37%, at most 35%, or at most 32% of W1 Additionally or alternatively, the width, W2, may be at least 11% of W1, such as at least 13%, at least 15%, at least 18%, at least 20%, at least 24%, at least 25%, at least 27%, at least 29%, at least 30%, at least 32%, at least 35%, at least 37%, at least 39%, at least 41%, at least 43%, at least 45%, at least 49%, at least 51%, at least 53%, at least 54%, at least 58%, at least 62%, at least 65%, at least 67%, at least 69%, at least 70%, at least 72%, at least 75%, at least 77%, at least 79%, at least 81%, at least 83%, at least 84%, at least 88%, or at least 90% of W1 Moreover, the width, W2 may be in a range including any of the minimum and maximum values noted herein.

In an embodiment, the body 112 can include a particular W3 of the third abrasive portion that may facilitate improved performance of the abrasive article. In a further embodiment, the width, W3, of the third portion may be at most 95% of the width, W1, of the first abrasive portion, such as at most 94%, at most 92%, at most 90%, at most 88%, at most 85%, at most 82%, at most 80%, at most 78%, at most 75%, at most 73%, at most 71%, at most 68%, at most 65%, at most 62%, at most 60%, at most 58%, at most 56%, at most 53%, at most 51%, at most 47%, at most 45%, at most 43%, at most 40%, at most 37%, at most 35%, or at most 32% of W1 Additionally or alternatively, the width, W3, may be at least 11% of W1, such as at least 13%, at least 15%, at least 18%, at least 20%, at least 24%, at least 25%, at least 27%, at least 29%, at least 30%, at least 32%, at least 35%, at least 37%, at least 39%, at least 41%, at least 43%, at least 45%, at least 50%, at least 52%, at least 55%, at least 59%, at least 61%, at least 62%, at least 65%, at least 67%, at least 69%, at least 70%, at least 72%, at least 75%, at least 77%, at least 79%, at least 81%, at least 83%, at least 84%, at least 88%, at least 90% or at least 93% of W1 Moreover, the width, W3 may be in a range including any of the minimum and maximum values noted herein.

In an embodiment, the body 112 can include a particular ratio of the width W2 of the second abrasive portion to the width W3 of the third abrasive portion that may facilitate improved performance of the abrasive article. In a further embodiment, the width, W3, of the third portion may be at most 98% of the width, W2, of the first abrasive portion, such as at most 95%, at most 93%, at most 90%, at most 88%, at most 85%, at most 82%, at most 80%, at most 78%, at most 75%, at most 73%, at most 71%, at most 68%, at most 65%, at most 62%, at most 60%, at most 58%, at most 56%, at most 53%, at most 51%, at most 47%, at most 45%, at most 43%, at most 40%, at most 37%, at most 35%, or at most 32% of W2. Additionally or alternatively, the width, W3, may be at least 21% of W2, such as at least 23%, at least 25%, at least 28%, at least 30%, at least 34%, at least 35%, at least 37%, at least 39%, at least 40%, at least 42%, at least 45%, at least 47%, at least 49%, at least 51%, at least 53%, at least 54%, at least 58%, at least 62%, at least 65%, at least 67%, at least 69%, at least 70%, at least 72%, at least 75%, at least 77%, at least 79%, at least 81%, at least 83%, at least 84%, at least 88%, or at least 90% of W2. Moreover, the width, W3 may be in a range including any of the minimum and maximum values noted herein.

In an embodiment, the body 112 of the abrasive component 120 can include a transitional edge connecting the inner circumferential surface portion 153 and the outer circumferential surface portion 154 of the first abrasive portion to the inner and outer circumferential surface portions of the adjacent abrasive portion, respectively. For example, as illustrated in FIG. 3A, a transitional edge 155 can be connected to the inner circumferential surface portions of the first abrasive portion 131 and the third abrasive portion 133 and connecting the outer circumferential surface portions of the first abrasive portion 131 and the third abrasive portion 133. In a further example, a transitional edge 158 can connect the inner circumferential surface portions of the second abrasive portion 132 and the third abrasive portion 133; and the outer circumferential surface portions of the third abrasive portion 133 and second abrasive portion 132.

In an embodiment, the circumferential length of the abrasive portions may be the same or different. For example, L1 and L2 of the first and second abrasive portions may be the same or different. In a particular example, L1>L2. In another particular example, L1 may be at most L2. In a further example, L3>L2. In still another example, L3≤L1. In another example, L2≤L3.

In another embodiment, the first abrasive portion can have a particular length L1 that can facilitate improved performance of the abrasive article. For example, the circumferential length L1 of the first abrasive portion can be at least 25% of the total circumferential length $L_{AC}$ of the body of the abrasive component, such as at least 30%, at least 35%, at least 40%, at least 43%, at least 46%, at least 48%, at least 50%, at least 53%, at least 55%, at least 57%, at least 60%, at least 65%, at least 68%, at least 70%, or at least 72% of the total circumferential length $L_{AC}$ of the body of component. In another example, the circumferential length L1 of the first abrasive portion can be at most 85% of the total circumferential length of the body of the abrasive component, at most 80%, at most 76%, at most 72%, at most 70%, at most 67%, at most 64%, at most 61%, at most 58%, at most 54%, or at most 50% of the total circumferential length $L_{AC}$ of the body of the abrasive component. Moreover, the circumferential length L1 of the first abrasive portion can be in a range including any of the minimum and maximum values noted herein.

In a further embodiment, the second abrasive portion can include a particular length, L2, that can facilitate improved performance of the abrasive article. For example, the circumferential length L2 of second abrasive portion may be at least 10% of the total circumferential length $L_{AC}$ of the body of the abrasive component, such as at least 15%, at least 20%, at least 25%, at least 30% of the total circumferential length of the body of the at least one abrasive component, at least 33%, at least 35%, at least 37%, at least 40%, at least 42%, or at least 45% of the total circumferential length $L_{AC}$ of the body of the abrasive component. In another example, the circumferential length L2 of the second abrasive component can be at most 80% of the total circumferential length $L_{AC}$ of the body of the abrasive component, at most 76%, at most 74%, at most 71%, at most 69%, at most 66%, at most 63%, at most 60%, at most 56%, at most 53%, at most 51%, at most 46%, at most 43%, or at most 41% of the total circumferential length $L_{AC}$ of the body of the abrasive component. Moreover, the circumferential length L2 of the second abrasive portion can be in a range including any of the minimum and maximum values noted herein.

In a further embodiment, the third abrasive portion can include a particular circumferential length, L3, that can facilitate improved performance of the abrasive article. For example, the circumferential length L3 of third abrasive portion may be at least 10% of the total circumferential length $L_{AC}$ of the body of the abrasive component, such as, at least 15%, at least 18%, at least 22%, at least 25%, at least 28%, at least 30%, at least 33%, at least 36%, at least 39%, at least 41%, at least 45%, at least 52%, at least 55%, at least 58%, at least 60%, at least 63%, at least 65%, or at least 68% of the total circumferential length $L_{AC}$ of the body of the abrasive component. In another example, the circumferential length L3 of the third abrasive portion may be at most 70% of the total circumferential length $L_{AC}$ of the body of the abrasive component, such as at most 69%, at most 66%, at most 63%, at most 60%, at most 56%, at most 53%, at most 51%, at most 40%, at most 36%, at most 33%, at most 30%, at most 28%, at most 25%, at most 21%, at most 18%, at most 15%, or at most 13% of the total circumferential length $L_{AC}$ of the body of the abrasive component. Moreover, the circumferential length L2 of the second abrasive portion can be in a range including any of the minimum and maximum values noted herein.

In an embodiment, the body 112 can include a particular ratio of L1 to L2 that may facilitate improved performance of the abrasive article. For example, the ratio of L1/L2 may be at least 1:10, such as, at least 1:9, at least 1:8, at least 1:7, at least 1:6, at least 1:5, at least 1:4, at least 1:3, at least 1:2, at least 1:1, at least 1:0.9, at least 1:08, at least 1:0.7, at least 1:0.6, at least 1:0.5, at least 1:0.4, at least 1:0.3, at least 1:02, or at least 1:0.1. In another example, the ratio of L1/L2 may be at most 20:1, at most 18:1, at most 16:1, at most 14:1, at most 12:1, at most 10:1, at most 9:1, at most 8:1, at most 7:1, at most 6:1, at most 5:1, at most 4:1, at most 3:1, at most 2:1, at most 1:1, at most 0.9:1, at most 0.8:1, at most 0.7:1, or at most 0.6:1. Moreover, the ratio of L1 to L2 can be in a range including any of the minimum and maximum ratios noted herein.

In an embodiment, the body 112 can include a particular ratio of L1 to L3 that may facilitate improved performance of the abrasive article. For example, the ratio of L1/L3 may be at least 1:10, such as, at most 1:9, at least 1:8, at least 1:7, at least 1:6, at least 1:5, at least 1:4, at least 1:3, at least 1:2, at least 1:1, at least 1:0.9, at least 1:08, at least 1:0.7, at least 1:0.6, at least 1:0.5, at least 1:0.4, at least 1:0.3, at least 1:02, or at least 1:0.1. In another example, the ratio of L1/L3 may be at most 20:1, at most 18:1, at most 16:1, at most 14:1, at most 12:1, at most 10:1, at most 9:1, at most 8:1, at most 7:1, at most 6:1, at most 5:1, at most 4:1, at most 3:1, at most 2:1, at most 1:1, at most 0.9:1, at most 0.8:1, at most 0.7:1, or at most 0.6:1. Moreover, the ratio of L1 to L3 can be in a range including any of the minimum and maximum ratios noted herein.

In an embodiment, the body 112 can include a particular ratio of L2 to L3 that may facilitate improved performance of the abrasive article. For example, the ratio of L2/L3 may be at least 1:10, such as, at most 1:9, at least 1:8, at least 1:7, at least 1:6, at least 1:5, at least 1:4, at least 1:3, at least 1:2, at least 1:1, at least 1:0.9, at least 1:08, at least 1:0.7, at least 1:0.6, at least 1:0.5, at least 1:0.4, at least 1:0.3, at least 1:02, or at least 1:0.1. In another example, the ratio of L2/L3 may be at most 20:1, at most 18:1, at most 16:1, at most 14:1, at most 12:1, at most 10:1, at most 9:1, at most 8:1, at most 7:1, at most 6:1, at most 5:1, at most 4:1, at most 3:1, at most 2:1, at most 1:1, at most 0.9:1, at most 0.8:1, at most 0.7:1, or at most 0.6:1. Moreover, the ratio of L2 to L3 can be in a range including any of the minimum and maximum ratios noted herein.

In a particular implementation, the abrasive component can include a body including a first abrasive portion having the same circumferential length as the second abrasive portion and including a third abrasive portion having a circumferential length smaller than the circumferential lengths of the first and the second abrasive portions.

In another particular implementation, the abrasive component can include a body including the radial width W1 of the first abrasive portion and the radial width W2 of the second abrasive portion, wherein W2 can be at least 60% and at most 80% of W1 and including the radial width W3 of the third abrasive portion, wherein W3 can be at least 70% and at most 90% of W1 and at least 80% and at most 95% of W2. In an even more particular implementation, the radial width W2 of the second abrasive portion may be at least 65% and at most 78% of the radial width W1 of the first abrasive portion, and the radial width W3 of the third abrasive portion may be at least 73% and at most 85% of W1 and at least 83% and at most 93% of W2.

The first abrasive portion 131 can include an inner circumferential surface portion 153 and an outer circumferential surface portion 154. The inner circumferential surface portion 153 can function as attack of the abrasive component 120 in a material removal operation, such as cutting, drilling, grinding or the like. FIG. 3B includes an illustration of a portion of a material removal operation involving the abrasive component 120 and a workpiece 199. The grinding face 125 of the abrasive component 120 can be in contact with the workpiece 199 and extend for the entire circumferential length $L_{AC}$ between the leading end 121 and the trailing end 122 of the abrasive component 120. The inner circumferential surface portion 153 and the outer circumferential surface portion 154 of the first abrasive portion 131 can be in contact with the workpiece. The reduced radial width W3 of the third abrasive portion 133 can help form a gap 191 between the workpiece 199 and the inner and outer circumferential surface portions of the third portion 133, and further reduced radial width W3 can help form a gap 190 between the workpiece 199 and the inner and outer circumferential surface portions of the second portion 132. The gaps 190 and 191 can help reduce lateral friction and frontal friction in the cutting operation.

Figure 3C:
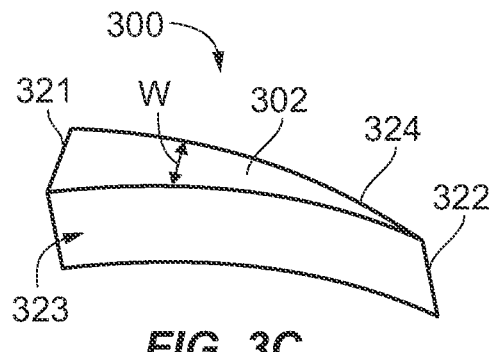
FIG. 3C includes an illustration of a perspective view of an exemplary abrasive component according to an embodiment.

FIG. 3C includes an illustration of a plan view of an abrasive component 300 according to an embodiment. The body 302 of the abrasive component 300 may have a generally wedged shape, including an inner circumferential surface 323 and an outer circumferential surface 324 extending between the leading end 321 and the trailing end 322. The radial width of the body 302 as measured from the inner circumferential surface 323 to the outer circumferential surface 324 can decrease along the circumferential length of the body 302 from the leading end 321 to the trailing end 322.

In an embodiment, an abrasive component may include a different number of abrasive portions than the illustrated abrasive component 120 in FIGS. 3A and 3B. In an example, an abrasive component may include at least 2 portions, at least 3 portions, at least 4 portions, at least 5 portions, or at least 6 portions. In another example, an abrasive component may include at most 60 portions, such as at most 50 portions, at most 40 portions, at most 30 portions, at most 20 portions, or at most 10 portions. Moreover, the number of portions of an abrasive component may be in a range including any of the minimum and maximum values noted herein.

Figure 3D:
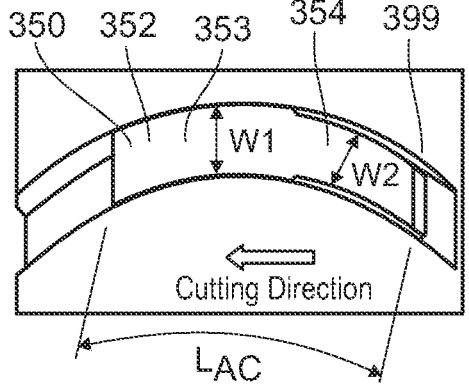
FIG. 3D includes an illustration of an exemplary abrasive component in contact with a workpiece according to another embodiment.

In a particular instance, the abrasive component can include two abrasive portions, such as, any two of the abrasive portions 131, 132, and 133 illustrated in FIGS. 3A and 3B. In particular, the two abrasive portions may be directly connected to one another. FIG. 3D includes an illustration of an abrasive component 350 including two abrasive portions in an material removal operation involving a workpiece 399. The body 352 of the abrasive component 350 can include a first abrasive portion 353 directly connected to the second abrasive portion 354. The body 352 can include similar features described with respect to the body 112 illustrated in FIGS. 1, 3A, and 3B, except for the number of the abrasive portions.

In an embodiment, the abrasive component may include a certain height. In an example, the abrasive component can have a height of at least 2 mm, at least 4 mm, at least 5 mm, at least 7 mm, at least 8 mm, at least 9 mm, at least 10 mm, at least 11 mm, at least 12 mm, at least 14 mm, at least 16 mm, at least 18 mm, at least 21 mm, or at least 24 mm. In another example, the abrasive component can have a height of not greater than 32 mm. Moreover, the height of the abrasive component may be in a range including any of the minimum and maximum values noted herein.

Figure 3E:
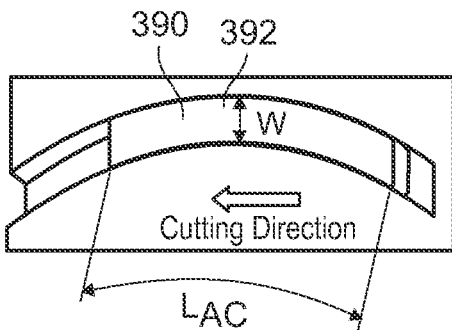
FIG. 3E includes an illustration of another abrasive component in contact with a workpiece.
Figure 3F:
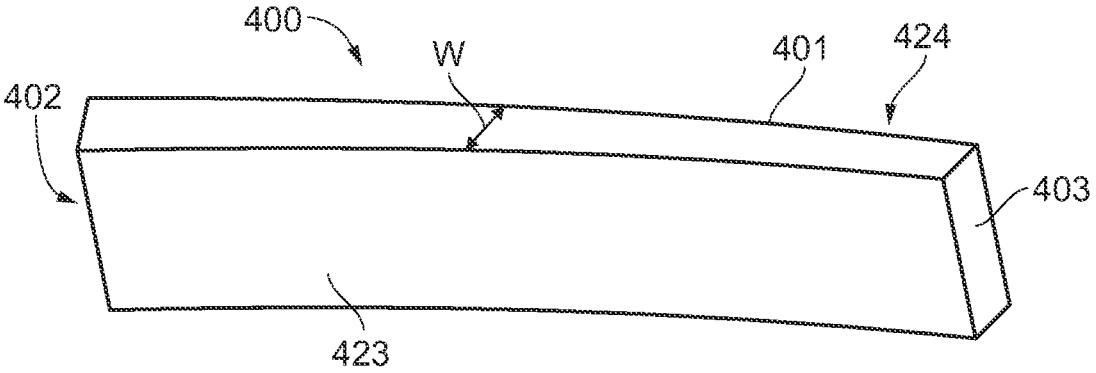
FIGS. 3F and 3G include illustrations of abrasive components according to embodiments.

In another embodiment, the radial width W1 of the first abrasive portion 131 of the abrasive component 120 as illustrated in FIGS. 3A and 3B may gradually reduce with usage and wear of the abrasive component/abrasive article. For example, due to wear, the radial width W1 of the first abrasive portion 131 may become similar to the radial width W3 of the third abrasive portion 133. In another instance, as the difference in radial width is worn out, at some point of the service life of the abrasive component 120, the first abrasive portion 131 and the third abrasive portion 133 may appear as one abrasive portion, and the abrasive component may have the shape as illustrated for the abrasive component 350 in FIG. 3D. In another instance, with the continuing usage and wear of the abrasive component 350, the first abrasive portion 353 may have a radial width that is similar to the radial width of the second abrasive portion 354, the first abrasive portion 353 and the second abrasive portion 354 may appear as one abrasive portion, and the abrasive component may have the shape of the abrasive component 390 as illustrated in FIG. 3E. The body 392 of the abrasive segment 390 can include a radial width W that may be substantially the same through the circumferential length of the body 392.

In another embodiment, the abrasive component may include more than 3 abrasive portions. For example, the abrasive component can include a body including one or more additional abrasive portions connected to the second abrasive portion 132 illustrated in FIGS. 3A and 3B. For example, a fourth abrasive portion may be connected to the second abrasive portion 132 and including a radial width that is smaller than W2. In another example, a fifth abrasive portion may be connected to the fourth abrasive portion and including an even smaller radial width.

FIG. 3F includes an illustration of a particular example of an abrasive component 400 including a body 401 including the end 402 and the end 403 opposite the end 402. The end 402 may include a greater width the end 403. The body 401 may include an inner circumferential surface 423 and an outer circumferential surface 424 extending between the ends 402 and 403. The radial width W of the body 401 as measured from the inner circumferential surface 423 to the outer circumferential surface 424 can decrease along the circumferential length of the body 402 from the end 402 to the end 403. In a particular example, the end 402 may be the leading end and the end 403 may be the trailing end. In another instance, the end 402 may be the leading end and the end 403 may be the trailing end.

Figure 3G:
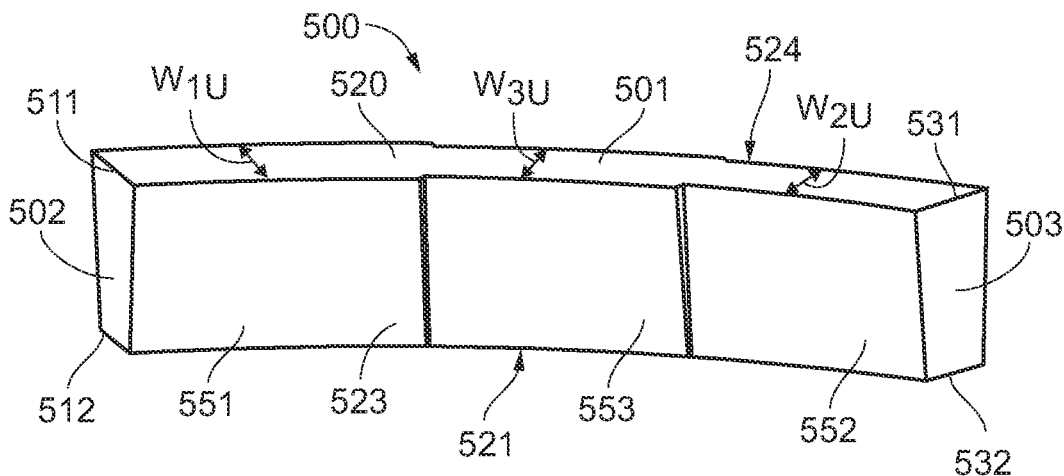

FIG. 3G includes an illustration of another particular example of an abrasive component 500 including a body 501 including a first abrasive portion 551, a second abrasive portion 552, and a third abrasive portion 553 connected to the first and second abrasive portions 551 and 552. The body 501 includes an end 502 and an end 503 opposite the end 502. Similar to the abrasive component 120, either the end 502 or the end 503 may be the leading end and the other may be the trailing end. In a particular example, the end 502 may be the leading end and the end 503 may be the trailing end.

The abrasive component 500 may have similar features to those described with respect to the abrasive component 120 illustrated in FIGS. 1 and 3A-3B except that as illustrated in FIG. 3G, each abrasive portion 551, 552 or 553 has a cross section cut in the radial direction in the shape of a trapezoid, such as the trapezoid shape of the end 502 or 503. As illustrated, the end 502 has an upper base 511 greater than the lower base 512; and the end 503 has the upper base 531 greater than the lower base 532. Further, the upper base 511 of the end 502 can be greater than the upper base 531 of the end 503; and the lower base 512 of the end 502 can be greater than the lower base 532 of the end 503.

The body 501 can include an inner circumferential surface 523 and the outer circumferential surface 524 extending between the ends 502 and 503. The upper surface 520 and the lower surface 521 can extend between the ends 502 and 503 and between the inner and outer circumferential surfaces 523 and 524. The radial width of each abrasive portion can be measured from the inner circumferential surface 523 to the outer circumferential surface 524 for the respective abrasive portion and may decrease in the direction from the upper surface 520 toward the lower surface 521. As illustrated, the first abrasive portion 551 may include an upper radial width $W_{1U}$ that can be measured at the upper surface within the first abrasive portion between the inner and outer circumferential wall 523 and 524. The first abrasive portion 551 may further include a lower radial width $W_{1L}$ that can be measured at the lower surface within the first abrasive portion between the inner and outer circumferential wall 523 and 524. It can be appreciated that $W_{1U}$ may be substantially the same as the length of the upper base 511; and $W_{1L}$ may be may be substantially the same as the length of the lower base 512.

The second abrasive portion 552 may include an upper radial width $W_{2U}$ that can be measured at the upper surface within the second abrasive portion between the inner and outer circumferential wall 523 and 524. The second abrasive portion 552 may further include a lower radial width $W_{2L}$ that can be measured at the lower surface within the second abrasive portion between the inner and outer circumferential wall 523 and 524. It can be appreciated that $W_{2U}$ may be substantially the same as the length of the upper base 531; and $W_{2L}$ may be may be substantially the same as the length of the lower base 532.

The third abrasive portion 553 may include an upper side radial width $W_{3U}$ that can be measured at the upper surface within the second abrasive portion between the inner and outer circumferential wall 523 and 524. The third abrasive portion 552 may further include a lower radial width $W_{3L}$ that can be measured at the lower surface within the second abrasive portion between the inner and outer circumferential wall 523 and 524. It can be appreciated that the third abrasive portion 553 may have a cross section cut in the radial direction in the shape of trapezoid, similar to the ends 502 and 503. It can be further appreciated, the cross section may include an upper base that has a length substantially the same as $W_{3U}$ and a lower base that has a length substantially the same as $W_{3L}$.

In an embodiment, the abrasive component can include abrasive particles contained in a bond material. The abrasive particles can include an abrasive material having a Mohs hardness of at least about 4, such as at least about 5, at least about 6, or at least about 7. In particular instances, the abrasive particles can include a superabrasive material, such as diamond, cubic boron nitride, or a combination thereof. In one embodiment, the abrasive grains consist essentially of diamond.

In a further embodiment, the abrasive particles can have a particle size of not less than about 400 US mesh, such as not less than about 100 US mesh. In particular instances, the abrasive particle size may be at most 16 US mesh or at most 25 US mesh. Moreover, the particle size maybe from 16 to 100 US mesh or from 25 to 80 US mesh. Depending on the application, the size may be from 30 to 60 US mesh.

In an embodiment, the abrasive particles can be present in an amount from 2 vol % to 70 vol % for a total volume of the body of the abrasive component. The amount of abrasive particles may depend on the application. For example, an abrasive component for a grinding or polishing tool can include from 3.75 vol % to 50 vol % abrasive particles of the total volume of the body of the abrasive component. Alternatively, an abrasive component for a cutting-off tool can include from 2 vol % to 6.25 vol % abrasive particles of the total volume of the body of the abrasive component. Further, an abrasive component for core drilling can include from 6.25 vol % to 20 vol % abrasive particles of the total volume of the body of the abrasive component.

In an embodiment, the bond material of the abrasive component can include an inorganic material, such as a vitreous bond, metal bond, metal alloy bond, and a combination thereof. In particular embodiments, the bond material may include a metal or metal alloy. In particularly instances, the bond material can be formed from a transition metal element or even a combination of transition metal elements. In a further example, the bond material can include metal elements such as iron, tungsten, cobalt, nickel, chromium, titanium, silver, or any combination thereof. In further instances, the bond material can include a rare earth element such as cerium, lanthanum, neodymium, or any combination thereof.

In another embodiment, the bond material can include a wear resistant component. For example, the bond material can include tungsten carbide.

In certain designs, the bond material can include particles of individual metal components or pre-alloyed particles. The particles can be from 1.0 microns to 250 microns.

In an embodiment, each abrasive portion can include a content of abrasive particles for a volume of the respective abrasive portion. In an embodiment, each abrasive portion may independently include any percentages of the contents of abrasive particles described herein with respect to the contents of abrasive particles relative to the total volume of the body. In particular embodiments, each abrasive portion can include the same content of abrasive particles. In another embodiment, the content of the abrasive particles may be different between abrasive portions. In an example, the abrasive portion including the leading end may include a greater content of abrasive particles than the abrasive portion including the trailing end. In a further example, the abrasive portion including the leading end may include a smaller content of abrasive particles than the abrasive portion including the trailing end. In another example, the abrasive portion including the leading end may include the greatest content of abrasive particles compared to the other abrasive portions. In another example, the abrasive portion including the trailing end may include the smallest content of abrasive particles compared to the other abrasive portions.

In a further embodiment, an abrasive portion closer to the leading end may include a higher content of abrasive particles comparing to an abutting abrasive portion. In still another example, an abrasive portion closer to the trailing end may include a greater content of abrasive particles compared to an abutting abrasive portion. Referring to FIG. 3A, in instances the end 121 is the leading end and the end 122 is the trailing end, the first abrasive portion 131 may include a higher content of abrasive particles than the third abrasive portion 133, and the third abrasive portion 133 may include a higher content of abrasive particle than the second abrasive portion 132. In another instance, the second abrasive portion 132 may include a higher content of abrasive particles than the third abrasive portion 133, and the third abrasive portion 133 may include a higher content of abrasive particles than the first portion 131. In still another example, at least some of the abrasive portions may include the same content of abrasive particles. For instance, the first abrasive portion 131 and the third abrasive portion 133 or the second abrasive portion 132 may include the same content of abrasive particles.

In a further embodiment, at least some or all of the abrasive portions may include abrasive particles including a same material. In a particular example, abrasive particles in each abrasive portion may include the same material. In another embodiment, at last one of the abrasive portions can include abrasive particles having a different material than one other abrasive portion.

In an embodiment, each abrasive portion can include a content of bond material for a volume of the respective abrasive portion. In an embodiment, each abrasive portion may independently include any percentages of the contents of the bond material described herein with respect to the contents of bond material relative to the total volume of the body. In particular embodiments, each abrasive portion can include the same content of the bond material. In another embodiment, the content of the bond material may be different between abrasive portions. In an example, the abrasive portion including the leading end may include a lower content of the bond material than the abrasive portion including the trailing end. In a further example, the abrasive portion including the leading end may include a greater content of the bond material than the abrasive portion including the trailing end. In another example, the abrasive portion including the leading end may include the smallest content of bond material compared to the other abrasive portions. In another example, the abrasive portion including the trailing end may include the greatest content of the bond material compared to the other abrasive portions.

In a further embodiment, an abrasive portion closer to the leading end may include a higher content of the bond material comparing to an abutting abrasive portion. In still another example, an abrasive portion closer to the trailing end may include a greater content of the bond material compared to an abutting abrasive portion. Referring to FIG. 3A, in instances the end 121 is the leading end and the end 122 is the trailing end, the first abrasive portion 131 may include a higher content of the bond material than the third abrasive portion 133, and the third abrasive portion 133 may include a higher content of the bond material than the second abrasive portion 132. In another instance, the second abrasive portion 132 may include a higher content of the bond material than the third abrasive portion 133, and the third abrasive portion 133 may include a higher content of the bond material than the first portion 131. In still another example, at least some of the abrasive portions may include the same content of the bond material. For instance, the first abrasive portion 131 and the third abrasive portion 133 or the second abrasive portion 132 may include the same content of the bond material.

In a further embodiment, at least some or all of the abrasive portions may include a same bond material. In a particular example, the bond material in each abrasive portion may be essentially the same. In another embodiment, at last one of the abrasive portions can include a different bond material than one other abrasive portion. In certain embodiment, the abrasive portion including the leading end may include a harder bond material compared to one other abrasive portion. In an example, an abrasive portion closer to the leading end may include a harder bond material compared to an abutting abrasive portion. In another example, an abrasive portion closer to the trailing end may include a harder bond material compared to an abutting abrasive portion.

In an embodiment, each abrasive portion may be directly bonded to an abutting abrasive portion. For example, a gap may not be disposed between adjacent abrasive portions in the circumferential direction. In another example, the grinding face of the abrasive component may extend continuously between the leading end and the trailing end. In a further embodiment, the abrasive portions may be integrated to form a unitary abrasive component with or without transitional edges.

In another embodiment, the abrasive component can be formed such that an infiltrant is present within the interconnected network of pores within the body of the abrasive component. The infiltrant can partially fill, substantially fill, or even completely fill the volume of the pores extending through the volume of the body of the abrasive component. In accordance with one particular design, the infiltrant can be a metal or metal alloy material. For example, some suitable metal can include copper, tin, zinc, and a combination thereof.

In particular instances, the infiltrant can be a bronzing material made of a metal alloy. In more particular instances, the infiltrant may include a copper-tin metal alloy that may be particularly suited for welding according to embodiments herein. For example, the bronzing material can consist essentially of copper and tin. Certain bronzing materials can incorporate particular contents of tin, such as greater than 5% by weight, such as at least 6% by weight, at least 7% by weight, or at least 8% by weight for the total weight of the bronzing material. Further, certain bronzing materials can incorporate particular contents of tin at most 20% by weight, such as at most 15% by weight, at most 12% by weight, or at most 10% by weight of the total amount of the bronzing material. Moreover, the bronzing material can include an amount of tin within a range including any of the minimum and maximum percentages noted herein.

In another embodiment, bronzing materials can be used as infiltrant material and can have an amount of copper. For example, the bronzing material may include at least 80% by weight of copper, at least 85% by weight, or even at least 88% by weight for the total amount of the bronzing material. In further instances, bronzing materials can utilize an amount of copper within a range from 80% to 95% by weight, such as from 85% to 95% by weight, or even from 88% to 93% by weight of the total amount of the bronzing material.

In a further embodiment, the bronzing material may contain a particularly low content of other elements, such as zinc, to facilitate proper formation of the abrasive article according to the forming methods of the embodiments herein. For example, the bronzing material may utilize not greater than 10%, such as not greater than 5%, or even not greater than 2% by weight of zinc for the total weight of the bronzing material. In particular examples, the bronzing materials may be essentially free of zinc.

In a further embodiment, the abrasive component may include a particular content of the bond material that can facilitate improved formation and performance of an abrasive article. For instance, the content of the bond material can be at least 1 vol % for a total volume of the body of the abrasive component, such as, at least 5 vol %, at least 10 vol %, at least 15 vol %, at least 18 vol %, at least 20 vol %, at least 25 vol %, at least 27.5 vol %, at least 35 vol %, or at least 40 vol % for the total volume of the body. In another instance, the abrasive component body can include the content of the bond material of at most 85 vol % for a total volume of the body, such as at most 80 vol %, at most 75 vol %, most 70 vol %, at most 65 vol %, at most 60 vol %, at most 55 vol %, at most 52 vol %, at most 48 vol %, or at most 40 vol % for the total volume of the body. It is to be understood that the body 100 can include the bond material in a content including the minimum and maximum percentages noted herein. For instance, the body 100 can include the bond material in a content in a range from 5 vol % to 85 vol % or in a range from 15 vol % to 75 vol % for the total volume of the body.

In an embodiment, the abrasive component may be manufactured, such that abrasive particles can be combined with the bond material to form a mixture. The bond material can include a blend of particles of the components of the bond or can be pre-alloyed particles of the bond. In a further embodiment, the bond material can conform to the formula $(WC)_w W_x Fe_y Cr_z X_{(1-w-x-y-z)}$, wherein $0 \leq w \leq 0.8$, $0 \leq x \leq 0.7$, $0 \leq y \leq 0.8$, $0 \leq z \leq 0.05$, $w+x+y+z \leq 1$, and X can include other metals such as cobalt and nickel. In another embodiment, the metal matrix can conform to the formula $(WC)_w W_x Fe_y Cr_z Ag_v X_{(1-v-w-x-y-z)}$, wherein $0 \leq w \leq 0.5$, $0 \leq x \leq 0.4$, $0 \leq y \leq 1.0$, $0 \leq z \leq 0.05$, $0 \leq v \leq 0.1$, $v+w+x+y+z \leq 1$, and X can include other metals such as cobalt and nickel.

The mixture can be disposed into a shaping device, such as a mold, capable of providing a desired shape. For instance, the mold can provide a shape of the abrasive component. In some instances, the mold can include a plurality of regions to facilitate shaping and forming a plurality of abrasive preforms.

The mixture including the bond material and abrasive particles can be formed into an abrasive preform by a pressing operation, such as by cold pressing, to form to a porous abrasive component. In an exemplary implementation, cold pressing can be carried out at a pressure from 100 MPa to 2500 MPa. The resulting porous abrasive component can have a network of interconnected pores. In an example, the porous abrasive segment can have a porosity from 25 vol % to 50 vol % for the total volume of the abrasive component preform.

The resulting porous abrasive component can then be subject to an infiltration process, wherein the infiltrant material is disposed within the body of the abrasive component, and particularly, disposed within the interconnected network of pores within the body of the abrasive segment. The infiltrant may be drawn into the pores of the cold pressed abrasive component via capillary action. After the infiltration process, the resulting densified abrasive component can be not less than about 96% dense. The amount of infiltrant that infiltrates the abrasive component can be between about 20 wt % and 45 wt % of the densified abrasive component.

In a further embodiment, the abrasive component may include a backing region, disposed between the abrasive component and the core, which facilitates the joining of the abrasive component and the core. According to one embodiment, the backing region can be a distinct region from the abrasive component and the core. Still, the backing region can be initially formed as part of the abrasive component, and particularly may be a distinct region of the abrasive component along the bottom surface of the abrasive component that has particular characteristics facilitating the joining of the abrasive component and the core. For example, according to one embodiment, the backing region can have a lesser percentage (vol %) of abrasive particles as compared to the amount of abrasive particles within the abrasive component. In fact, in certain instances, the backing region can be essentially free of abrasive particles. In particular embodiments, including a backing between the body of the abrasive component and the core may be particularly suitable for forming methods utilizing a beam of energy (e.g., a laser) used to weld the abrasive component to the core. In another embodiment, the abrasive components may be brazed to the core.

In a further embodiment, at least a portion of the backing region can include a bonding composition. The bonding composition can include a metal or metal alloy. Some suitable metal materials can include transition metal elements, including for example, titanium, silver, manganese, phosphorus, aluminum, magnesium, chromium, iron, lead, copper, tin, and a combination thereof.

In particular instances, the bonding composition can be similar to the infiltrant, such that the bonding composition and the infiltrant are different from each other by not greater than a single elemental species. In even more particular instances, the bonding composition can be the same as the infiltrant. According to embodiments herein, the bonding composition can be related to the infiltrant composition in having a certain degree of commonality of elemental species. Quantitatively, an elemental weight percent difference between the bonding composition and the infiltrant composition does not exceed 20 weight percent. Elemental weight percent difference is defined as the absolute value of the difference in weight content of each element contained in the bonding composition relative to the infiltrant composition. Other embodiments have closer compositional relationships between the bonding composition and the composition of the infiltrant. The elemental weight percent difference between the bonding composition and the infiltrant composition may, for example, not exceed 15 weight percent, 10 weight percent, 5 weight percent, or may not exceed 2 weight percent. An elemental weight percent difference of about zero represents the same composition making up the backing region and the infiltrant. The foregoing elemental values may be measured by any suitable analytical means, including microprobe elemental analysis, and ignores alloying that might take place along areas in which the infiltrant contacts the bond material.

The backing region can include at least about 90 wt % infiltrant, such as at least about 95 wt % infiltrant, such as at least about 98 wt % infiltrant. The infiltrant can be continuous throughout the backing region and the densified abrasive segment. In certain instances, the backing region can be formed primarily of the infiltrant material, and in more particular instances, can consist essentially of the infiltrant material. Still, in other embodiments, the backing region can be an infiltrated region, like the abrasive component. Accordingly, the backing region can include a network of interconnected pores formed between a matrix metal, and wherein the infiltrant material substantially fills the interconnected pores. The backing region can contain similar amounts of matrix metal and infiltrant. Notably, the backing region may be essentially free of abrasive particles. In such embodiments wherein the backing region includes interconnected pores substantially filled with the infiltrant, the infiltrant material can act as a bronzing material in forming a joint (e.g., a welded joint) between the base and the abrasive segment. In one embodiment, the backing region can be formed of the bronzing material described herein. In fact, certain backing regions can consist essentially of a copper-tin bronzing material having about 88% copper and 12% tin or 90% copper and 10% tin.

In an embodiment, a method of making the abrasive article can include affixing the abrasive component to the core by welding the abrasive component to the core. In a particular example, the welding process can include impinging a beam of energy at the base of each abrasive component. More particularly, in the instance of the abrasive component having a backing region, welding can include impinging a beam of energy at the backing region between the abrasive component and the core. In particular instances, the beam of energy can be a laser, such that each abrasive component can be attached to the core via a laser welded bond joint. The laser may be a Roffin laser source commonly available from Dr. Fritsch, GmbH.

In an embodiment, the abrasive component can be formed by hot pressing. In an instance, the mixture including the abrasive particles and bond material may be pressed at a temperature from 600° C. to 1100° C. to form the finally formed abrasive component. In a further instance, pressure may be 100 to 300 bars. In instances, similar to cold pressing discussed above, a shaping device, such as a mold, may be used to facilitate hot pressing. In another embodiment, forming the abrasive component can include sintering the preform of the abrasive component. In an example, sintering may be conducted at a temperature from 600° C. to 1200° C.

In another instance, sintering may be performed for 5 minutes to 60 minutes. In particular examples, sintering can include free sintering. In another example, sintering can use an electro-discharge sintering process. In particular embodiments, sintering may be conducted without utilizing an infiltrant material. In certain instances, sintering may include contacting an infiltrant material with at least a portion of the preform of the abrasive component and free sintering.

In an embodiment, the finally formed abrasive component may include a particular porosity that may facilitate improved property and/or performance of the abrasive component and/or abrasive article. For example, the porosity may be at most 10 vol %, at most 8 vol %, at most 6 vol %, at most 5 vol %, at most 4 vol %, or at most 2 vol % for the total volume of the body of the abrasive component. In another instance, the porosity may be at least 0.5 vol %, at least 1 vol %, at least 2 vol %, at least 3 vol %, at least 4 vol %, at least 5 vol %, or at least 6 vol % for the total volume of the body of the abrasive component. Moreover, the abrasive component may include a porosity in a range including any of the minimum or maximum percentages noted herein.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiments

Embodiment 1. An abrasive article, comprising a core and at least one abrasive component attached to the core, wherein the at least one abrasive component comprises a body including a leading end and a trailing end, wherein the leading end has a width greater than a width of the trailing end.

Embodiment 2. The abrasive article of embodiment 1, wherein the at least one abrasive component comprises a first abrasive portion including the leading end and a second abrasive portion connected to the first abrasive portion including the trailing end.

Embodiment 3. The abrasive article of embodiment 2, wherein the first abrasive portion comprises a first inner circumferential wall and a first outer circumferential wall, wherein the leading end extends between the first inner circumferential wall and the first outer circumferential wall; and wherein the second abrasive portion comprises a second inner circumferential wall and a second outer circumferential wall, wherein the trailing end extends between the second inner circumferential wall and the second outer circumferential wall.

Embodiment 4. The abrasive article of embodiment 2 or 3, wherein the first abrasive portion comprises a first radial width measured from the first inner circumferential wall to the first outer circumferential wall; and wherein the second abrasive portion comprises a second radial width measured from the second inner circumferential wall to the second outer circumferential wall, wherein the first radial width is greater than the second radial width.

Embodiment 5. The abrasive article of embodiment 4, wherein the first radial width is substantial the same along a first circumferential length of the first abrasive portion, wherein the first circumferential length is at least 30% of a total circumferential length of the body of the at least one abrasive component.

Embodiment 6. The abrasive article of embodiment 4 or 5, wherein the second abrasive portion comprises a second circumferential length, wherein the second circumferential length is at least 30% of the total circumferential length of the body of the at least one abrasive component.

Embodiment 7. The abrasive article of embodiment 5 or 6, wherein the first circumferential length is at least 35%, at least 40%, at least 43%, at least 46%, at least 48% or at least 50% of the total circumferential length of the body of the at least one abrasive component.

Embodiment 8. The abrasive article of any one of embodiments 5 to 7, wherein the first circumferential length is at most 85% of the total circumferential length of the body of the at least one abrasive component, at most 80%, at most 76%, at most 72%, at most 70%, at most 67%, at most 64%, at most 61%, at most 58%, at most 54%, or at most 50% of the total circumferential length of the body of the at least one abrasive component.

Embodiment 9. The abrasive article of any one of embodiments 5 to 8, wherein the second circumferential length is substantially constant over the entire second circumferential length, wherein the second circumferential length is at least 25% of the total circumferential length of the body of the at least one abrasive component.

Embodiment 10. The abrasive article of embodiment 9, wherein the second circumferential length is at least 30% of the total circumferential length of the body of the at least one abrasive component, at least 33%, at least 35%, at least 37%, at least 40%, at least 42%, or at least 45% of the total circumferential length of the body of the at least one abrasive component.

Embodiment 11. The abrasive article of embodiment 9, wherein the second circumferential length is at most 70% of the total circumferential length of the body of the at least one abrasive component, at most 66%, at most 63%, at most 60%, at most 56%, at most 53%, at most 51%, at most 46%, at most 43%, or at most 41% of the total circumferential length of the body of the at least one abrasive component.

Embodiment 12. The abrasive article of any one of embodiments 2 to 11, wherein the body of the at least one abrasive component comprises a beveled edge connecting the leading end to the first inner and outer circumferential walls.

Embodiment 13. The abrasive article of any one of embodiments 2 to 12, wherein the body of the at least one abrasive component comprises a beveled edge connecting the trailing end to the second inner and outer circumferential walls.

Embodiment 14. The abrasive article of any one of embodiments 2 to 13, wherein the body of the at least one abrasive component comprises a chamfer between the first abrasive portion and the second abrasive portion.

Embodiment 15. The abrasive article of any one of embodiments 2 to 14, wherein the body of the at least one abrasive component comprises a third abrasive portion connected to the first and second abrasive portion, wherein the third abrasive portion comprises a third circumferential length.

Embodiment 16. The abrasive article of embodiment 15, wherein the body of the at least one abrasive component comprises a chamfer connecting the third portion to the first abrasive portion and the second abrasive portion.

Embodiment 17. The abrasive article of embodiment 15 or 16, wherein the third circumferential length is at least 10% of the total circumferential length of the body of the at least one abrasive component, at least 15%, at least 18%, at least 22%, at least 25%, or at least 28% of the total circumferential length of the body of the at least one abrasive component.

Embodiment 18. The abrasive article of any one of embodiments 15 to 17, wherein the third circumferential length is at most 40% of the total circumferential length of the body of the at least one abrasive component, at most 36%, at most 33%, at most 30%, at most 28%, at most 25%, at most 21%, at most 18%, at most 15%, or at most 13% of the total circumferential length of the body of the at least one abrasive component.

Embodiment 19. The abrasive article of any one of embodiments 1 to 18, wherein the body of the at least one abrasive component comprises a bond material and abrasive particles contained in the bond material, wherein the bond material is in a content of at least 10 vol % to 70 vol % for a total volume of the body, the abrasive particles are in the content of at least 5 vol % to 50 vol % for the total volume of the body; and a porosity of at most 10 vol % for the total volume of the body.

Embodiment 20. The abrasive article of any one of embodiments 1 to 19, wherein the body of the at least one abrasive component comprises a bond material including a metal element or metal alloy including a plurality of metal elements, wherein the metal element comprises iron, tungsten, cobalt, nickel, chromium, titanium, silver, a rare earth element including cerium, lanthanum, neodymium, or a combination thereof, or any combination thereof.

Embodiment 21. The abrasive article of any one of embodiments 1 to 20, wherein the body of the at least one abrasive component comprises abrasive particles including superabrasives including diamond, cubic boron nitride, or a combination thereof.

Embodiment 22. The abrasive article of any one of embodiments 1 to 21, wherein the core comprises an elongated body comprising a first end, a second end, and a length extending in the axial direction between the first end and the second end, wherein the at least one component is attached to the first end.

Embodiment 23. The abrasive article of any one of embodiments 1 to 22, wherein the core comprises an elongated body comprising a central opening extending through the elongated body in the axial direction.

Embodiment 24. The abrasive article of any one of embodiments 1 to 23, wherein the core comprises an iron-based alloy.

Embodiment 25. The abrasive article of any one of embodiments 1 to 23, comprising a plurality of abrasive components attached to the core, wherein the plurality of abrasive components are spaced apart by a same distance.

Embodiment 26. The abrasive article of embodiment 1, wherein the body of the at least one component comprises a tapered shape.

Embodiment 27. The abrasive article of embodiment 1 or 26, wherein the body of the at least one component comprises an outer circumferential wall, an inner circumferential wall, and a continuously reducing radial width in a direction from the leading end to the trailing end, wherein the radial width is measured from the outer circumferential wall to the inner circumferential wall.

EXAMPLES

Example 1

A representative abrasive article S1 in the form of a core drill is formed including 9 abrasive segments having the shape as illustrated in FIGS. 3A and 3B. Each of the abrasive segments has the height of approximately 10 mm (measured from the grinding face to the face attached to the core), a radial width of the first portion of approximately 3.6 mm, a radial width of the third portion of approximately 2.9 mm and a radial width of the second portion approximately 2.6 mm. Each segment has a circumferential length of approximately 23.5 mm. A backing of 2 mm high was attached between the core and the segments.

A conventional core drill S2 is formed including 9 abrasive segments having the shape of abrasive component 390 illustrated in FIG. 3E. Each segment has the height of approximately 7.7 mm, radial width of approximately 3.5 mm, and circumferential length of approximately 22.4 mm.

The segments of Samples S1 and S2 include the same composition including for the total volume of each segment, not greater than 5 vol % of porosity, 5 vol %-15 vol % of diamond abrasive particles, and the iron-copper-cobalt-nickel bond material. Active surface areas of S1 and S2 are approximately 73.48 mm$^2$ and 78.4 mm$^2$, respectively. Segments of Samples S1 and S2 were formed by sintering the green bodies at a temperature from 900° C. to 1100° C. without the application of pressure for up to 40 minutes as described in embodiments herein.

The core drill samples were tested for drilling on reinforced concrete workpieces. 3 holes having the diameter of 0.8 m were formed in the workpieces, and drilling speed was recorded and included in Table 1 below. As illustrated, Sample S1 has improved drill speed compared to S2.

TABLE 1

| Sample | Speed in reinforced concrete cm/min |
|---|---|
| S2 | 8.52 |
| S1 | 9.94 |

Embodiments disclosed herein represent a departure from the state of the art. The abrasive component as described in embodiments herein includes a body that can generate reduced friction allowing faster operation speed. The radial width and/or circumferential length of the abrasive portions, ratios thereof, the number of the abrasive portions, arrangement of the abrasive portions, or any combination thereof, can facilitate formation of the abrasive component having a reduced but sufficient active surface area (i.e., the total area in contact with the workpiece), which facilitates improved operation performance of the abrasive article.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. It will also be appreciated that reference to components as being coupled or connected is intended to disclose either direct connection between said components or indirect connection through one or more intervening components as will be appreciated to carry out the methods as discussed herein. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An abrasive article, comprising a core and at least one abrasive component attached to the core, wherein the at least one abrasive component comprises a body including:

a first abrasive portion including a leading end;

a second abrasive portion connected to the first abrasive portion including a trailing end and a second circumferential length of at least 30% of a total circumferential length of the body; and an inner circumferential surface and an outer circumferential surface extending between the leading end and the trailing end, wherein the leading end and the trailing end extend between the inner circumferential surface and the outer circumferential surface, wherein:

each of the leading end and trailing end has a width measured between the inner and outer circumferential surfaces, wherein the width of the trailing end is different than the width of the leading end; and the first abrasive portion comprises a first radial width measured between the inner circumferential surface and the outer circumferential surface, and the second abrasive portion comprises a second radial width measured between the inner circumferential surface and the outer circumferential surface, wherein the first radial width is greater than the second radial width.

2. The abrasive article of claim 1, wherein the width of the leading end is greater than the width of the trailing end.

3. The abrasive article of claim 1, wherein the first circumferential length is at least 25% of a total circumferential length of the body.

4. The abrasive article of claim 1, wherein the first radial width is constant along a first circumferential length of the first abrasive portion.

5. The abrasive article of claim 1, wherein the first radial width decreases along a first circumferential length of the first abrasive portion toward the trailing end.

6. The abrasive article of claim 1, wherein the body comprises a bond material and abrasive particles contained in the bond material, wherein the bond material comprises metal.

7. The abrasive article of claim 1, wherein the body comprises:

a bond material in a content of 10 vol % to 70 vol % for a total volume of the body;

abrasive particles in a content of 5 vol % to 50 vol % for the total volume of the body; and porosity of at most 10 vol % for the total volume of the body.

8. The abrasive article of claim 1, comprising a plurality of abrasive components attached to the core, wherein the plurality of abrasive components are spaced apart from one another along a circumference of the core.

9. The abrasive article of claim 1, wherein the body comprises a tapered shape.

10. The abrasive article of claim 9, wherein a radial distance between the outer circumferential surface and the inner circumferential surface reduces toward the trailing end.

11. The abrasive article of claim 1, wherein the body comprises a cross section in a shape of a trapezoid when cut in a radial direction of the abrasive article.

12. The abrasive article of claim 1, wherein:

the body comprises a top surface and a bottom surface extending between the inner and outer circumferential surfaces and between the leading and trailing ends, wherein the bottom surface is attached to the core; and the first abrasive portion comprises a radial width, $W_T$, measure along the top surface between the inner and outer circumferential surfaces; and a radial width, $W_B$, measured along the bottom surface between the inner and outer circumferential surfaces, wherein $W_T > W_B$.

13. An abrasive article, comprising a core and at least one abrasive component attached to the core, wherein the at least one abrasive component comprises a body including:

a first abrasive portion including a leading end;

a second abrasive portion connected to the first abrasive portion including a trailing end; and an inner circumferential surface and an outer circumferential surface extending between the leading end and the trailing end, wherein the leading end and the trailing end extend between the inner circumferential surface and the outer circumferential surface; and wherein each of the leading end and trailing end has a width measured between the inner and outer circumferential surfaces, wherein the width of the trailing end is different than the width of the leading end, and wherein the body comprises a transitional edge between the first abrasive portion and the second abrasive portion.

14. The abrasive article of claim 13, wherein the first abrasive portion comprises a first radial width measured between the inner circumferential surface and the outer circumferential surface; and wherein the second abrasive portion comprises a second radial width measured between the inner circumferential surface and the outer circumferential surface, wherein the first radial width is greater than the second radial width.

15. The abrasive article of claim 13, wherein the transitional edge comprises a chamfer.

16. The abrasive article of claim 13, wherein the second abrasive portion comprises a second circumferential length, wherein the second circumferential length is at least 30% of a total circumferential length of the body of the at least one abrasive component.

17. An abrasive article, comprising a core and at least one abrasive component attached to the core, wherein the at least one abrasive component comprises a body including:

a first abrasive portion including a leading end;

a second abrasive portion connected to the first abrasive portion including the trailing end;

a third abrasive portion connected to the first and second abrasive portions;

an inner circumferential surface and an outer circumferential surface extending between the leading end and the trailing end, wherein the leading end and the trailing end extend between the inner circumferential surface and the outer circumferential surface, and the leading end and trailing end have a different width measured between the inner and outer circumferential surfaces, wherein the third abrasive portion comprises a third radial width measured between the inner circumferential surface and the outer circumferential surface, wherein the third radial width is different from a first radial width of the first abrasive portion or a second radial width of the second abrasive portion or both.

18. The abrasive article of claim 17, wherein the body comprises a chamfer between the first abrasive portion and the third abrasive portion and between the third abrasive portion and the second abrasive portion.

19. The abrasive article of claim 17, wherein the third abrasive portion comprises a third circumferential length of at least 10% of a total circumferential length of the body.

20. The abrasive article of claim 17, wherein the body comprises a beveled edge connecting the leading end or the trailing end to the inner and outer circumferential surfaces.

* * * * *